(12) United States Patent
Kim

(10) Patent No.: US 6,521,472 B2
(45) Date of Patent: Feb. 18, 2003

(54) METHOD OF FORMING A CAPACITOR CONTAINER ELECTRODE AND METHOD OF PATTERNING A METAL LAYER BY SELECTIVELY SILICIZING THE ELECTRODE OR METAL LAYER AND REMOVING THE SILICIZED PORTION

(75) Inventor: Young-Ho Kim, Taegu (KR)

(73) Assignee: LG.Philips LCD Co., Ltd., Seoul (KR)

( * ) Notice: Subject to any disclaimer, the term of this patent is extended or adjusted under 35 U.S.C. 154(b) by 35 days.

(21) Appl. No.: 09/778,840

(22) Filed: Feb. 8, 2001

(65) Prior Publication Data

US 2001/0017682 A1 Aug. 30, 2001

(30) Foreign Application Priority Data

Feb. 8, 2000 (KR) .............................................. 00-5836

(51) Int. Cl.[7] .............................................. H01L 21/00
(52) U.S. Cl. .................................... 438/29; 349/126
(58) Field of Search ........................ 438/29–32, 42; 349/123, 126, 192

(56) References Cited

U.S. PATENT DOCUMENTS

| 5,172,255 A | * | 12/1992 | Brosig et al. | ................ 349/126 |
| 5,315,421 A | * | 5/1994 | Kurai et al. | ................. 349/126 |
| 5,353,141 A | * | 10/1994 | Onuma et al. | ............... 349/126 |

FOREIGN PATENT DOCUMENTS

| JP | 63066534 A | * | 3/1988 | ................... 430/20 |
| JP | 03156424 A | * | 7/1991 | .................. 349/124 |
| JP | 10111237 A | * | 4/1998 | |

* cited by examiner

Primary Examiner—Matthew Smith
Assistant Examiner—Craig P. Lytle
(74) Attorney, Agent, or Firm—Morgan, Lewis & Bockius LLP

(57) ABSTRACT

A method of rubbing for a liquid crystal display device includes the steps of rubbing an orientation film on a substrate using a first rubbing fabric, detecting defects of the orientation film, and repeating the step of rubbing the orientation using a second rubbing fabric when the defects are detected.

6 Claims, 4 Drawing Sheets

METHOD OF FORMING A CAPACITOR CONTAINER ELECTRODE AND METHOD OF PATTERNING A METAL LAYER BY SELECTIVELY SILICIZING THE ELECTRODE OR METAL LAYER AND REMOVING THE SILICIZED PORTION

This application claims the benefit of Korean Paten Application No. 2000-5836 filed on Feb. 8, 2000, which is hereby incorporated by reference.

BACKGROUND OF THE INVENTION

1. Field of the Invention

The present invention relates to a liquid crystal display (LCD), and more particularly to a method of fabricating a liquid crystal display device for eliminating a rubbing error.

2. Discussion of the Relate Art

An LCD device consumes a low power and weighs light. Due to such characteristics, it is well suited for use in word processors, personal computers, and navigational systems. The LCD conventionally includes an upper substrate having a transparent electrode, a lower substrate having a switching device and a pixel electrode, and a liquid crystal interposed between the upper and lower substrates. Various types of liquid crystals have been used in the LCD, such as a twisted nematic (TN) liquid crystal, a super twisted nematic (STN) liquid crystal, and a cholesteric liquid crystal.

FIG. 1 illustrates a cross-sectional view of a conventional LCD. As shown in FIG. 1, the conventional LCD 11 includes an upper substrate 5 having a color filter 7, a black matrix 6, and a common electrode 18. The LCD also has a lower substrate 21 spaced apart from the upper substrate 5. The lower substrate 21 has a pixel electrode 8 and a switching device (not shown) that are formed in a pixel area of the lower substrate 21. Orientation films 23 are formed on the upper and lower substrates 5 and 21. After the upper and lower substrates 5 and 21 are attached to each other using a sealant 35, a liquid crystal 33 is injected between the upper and lower substrates 5 and 21. Finally, upper and lower polarizers 25 and 27 are respectively formed on the outer surfaces of the upper and lower substrates 5 and 21.

The LCD 11 controls incident light by absorbing or transmitting from backlight 31. The control is based on an alignment of the molecules of the liquid crystal 33, which has an optical anisotropy. By properly controlling the transmission of the light from the back light 31, desired images can be displayed. Since the alignment of the molecules of the liquid crystal 33 affects an optical property of the LCD 11, it is very important to accurately control the alignment of those molecules. The orientation films 23 are critical elements in controlling the alignment of the liquid crystal molecules.

Conventionally, orientation films 23 are rubbed to have a plurality of minute grooves on their surface. Using a rubbing fabric rolled onto a roller, the surface of the orientation film is rubbed in a uniform direction. After rubbing, the orientation film has a plurality of minute grooves on its surface and an alignment angle due to the grooves such that the liquid crystal molecules align according to the alignment angle. In this process, a smooth fabric is used for the rubbing fabric. A rubbing apparatus includes a roller and has a relatively simple configuration. In a rubbing process, it is important to apply an appropriate rubbing force in a uniform direction. Unless the rubbing is uniform, localized variations of optical properties occur.

As previously explained the orientation films 23 on the upped and lower substrates 5 and 21 provide conditions such that a uniform liquid crystal molecule alignment is achieved. A relative orientation of the liquid crystal molecules is often indicated by an angle formed between the longitudinal axes of the liquid crystal molecules and the substrates. The alignment stability of a liquid crystal is greatly affected by an anchoring force that is produced between the substrate and the liquid crystal molecules. The anchoring force is dependent upon the surface area of the liquid crystal molecules and the orientation film. In other words, the anchoring force serves to stabilize an alignment state of the liquid crystal molecules.

Orientation films 23 can be inorganic, organic, or both inorganic and organic. For example, an inorganic orientation film may be formed by a silicon oxide ($SiO_2$) deposition method. In the $SiO_2$ deposition method, an inorganic material (such as a metal) or an oxide is deposited on the substrate such that a slope is formed between the inorganic material and the substrate. Silicon oxide ($SiO_2$) is conventionally used for the inorganic material. The molecular alignment of a liquid crystal varies with the deposited material, the liquid crystal itself, and deposition conditions including a deposition angle, speed, a vacuum rate, a substrate temperature, and a film thickness.

To achieve a uniform alignment, the orientation film formed on the substrate is repeatedly rubbed in one direction using a diamond paste. Due to the minute grooves formed on the orientation film along the rubbing direction, a desired alignment of the liquid crystal molecules is achieved. In practice, a tilt angle of the rubbing process is almost 0 degree, resulting in the liquid crystal molecules to be homogeneously aligned. Physical properties of the liquid crystal 33 vary with the molecular alignment. The alignment nay vary by external forces, such as an electric field. A technology for controlling the molecular alignment of the liquid crystal molecules 33 is of interest in fabricating an LCD.

The process of fabricating the above-mentioned orientation film is explained with reference to FIG. 2. As shown in FIG. 2, an orientation film 53 of polyimide or the like is formed on a substrate 51. Thereafter, the surface of the orientation film 53 is rubbed using a rubbing fabric 57 wound around a roller 55. The orientation film 53 has a plurality of minute grooves 53a. Since the rubbing fabric 57 has a plurality of woof and warp threads that are crossed with each other, a pattern of the minute grooves 53a are formed on the orientation film 53 during the above-mentioned rubbing process. However, when the rubbing process is repeated, defects may occur on the surface of the rubbing fabric 57 The defects of the rubbing fabric 57 result from either an extraneous matter on the orientation film 53 or patterns formed on the substrate 51. These defects of the rubbing fabric 57 cause rubbing defects such as an irregular surface of the orientation film 53 (a scratch error) or a wave of the polyimide.

FIG. 3 is a photograph showing a surface of an orientation film where the above-mentioned scratch error occurs. As shown in the drawing, the surface of the orientation film is very irregular. The above-mentioned irregular surface of the orientation film negatively affects a first alignment state of the liquid crystal. Thus, uniformity in aligning the liquid crystal molecules decreases. Therefore, a display quality of the liquid crystal display is deteriorated.

In another aspect, many complicate processes were already proceeded for the substrate having a defective orientation film. Nevertheless, since the substrate having a defective orientation film should be disposed, it causes a lot of losses in the Fabrication process.

SUMMARY OF THE INVENTION

Accordingly, the present invention is directed to a method of fabricating a liquid crystal display for eliminating an rubbing error that substantially obviates one or more of the problems due to limitations and disadvantages of the related art.

An object of the present invention is to provide a method of repairing a rubbing defect of a LCD device having orientation films.

Additional features and advantages of the invention will be set forth in the description, which follows and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a method of rubbing for a liquid crystal display includes the steps of rubbing an orientation film on a substrate using a first rubbing fabric, detecting defects of the orientation film, and repeating the step of rubbing the orientation film using a second rubbing fabric when the defects are detected.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENT

Reference will now be made in detail to the illustrated embodiments of the present invention, the examples of which are illustrated in the accompanying drawings.

Figure 1:
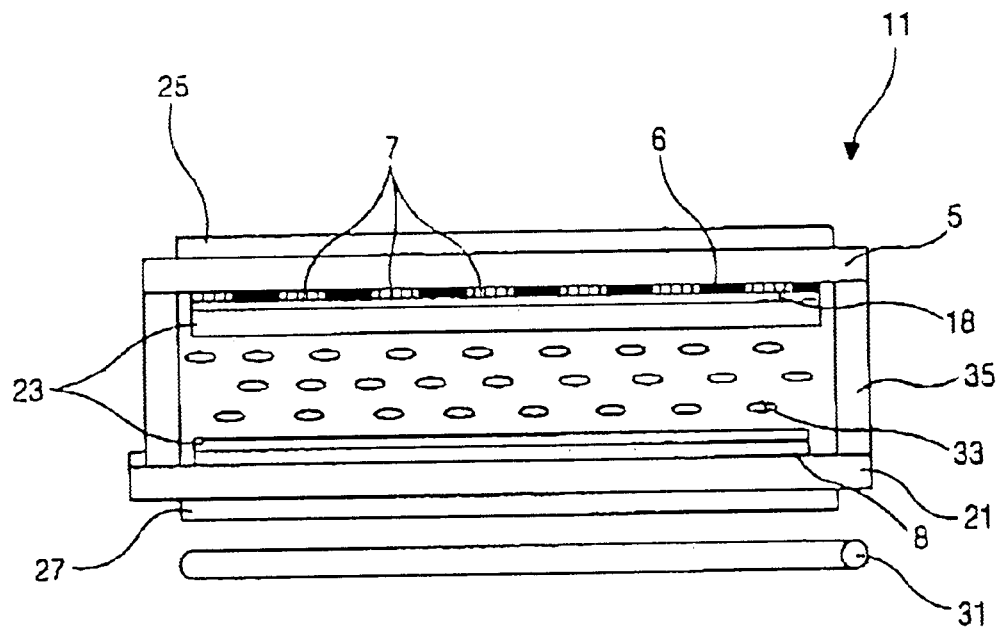
FIG. 1 is a cross-sectional view illustrating an LCD device according to the related art.
Figure 2:
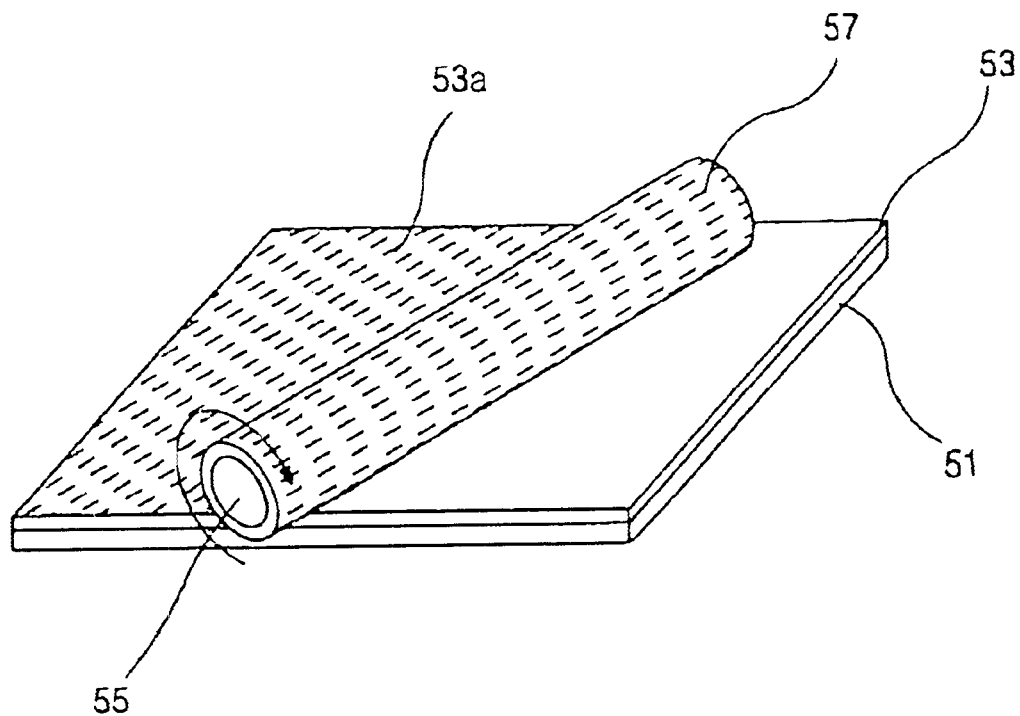
FIG. 2 is a perspective view illustrating a typical rubbing process for an orientation film of the LCD device according to the related art.
Figure 3:
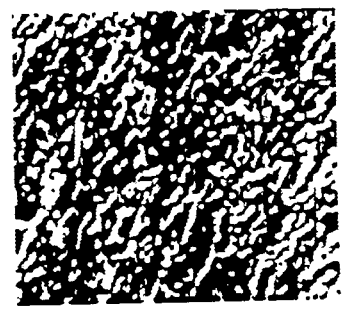
FIG. 3 is a photograph illustrating a surface of the orientation film where a scratch error occurs.
Figure 4A:
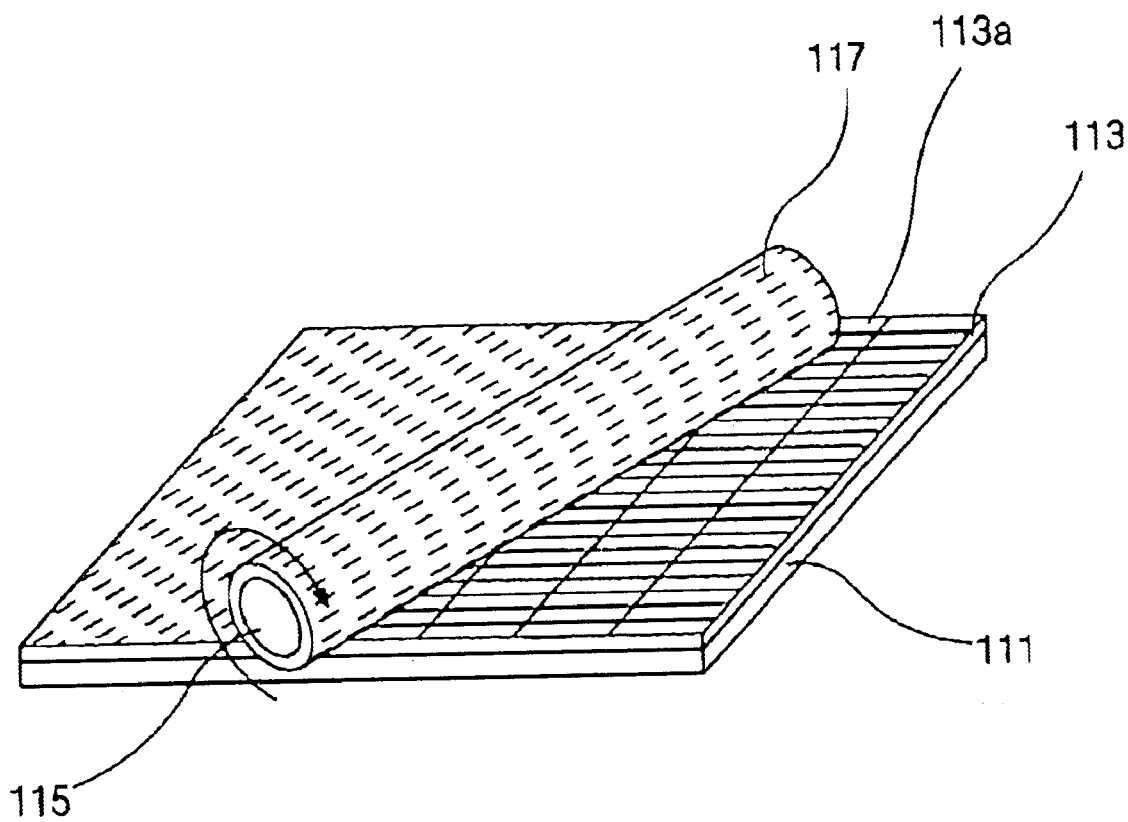
FIGS. 4A to 4C illustrate a rubbing process according to a preferred embodiment of the present invention.
Figure 4B:
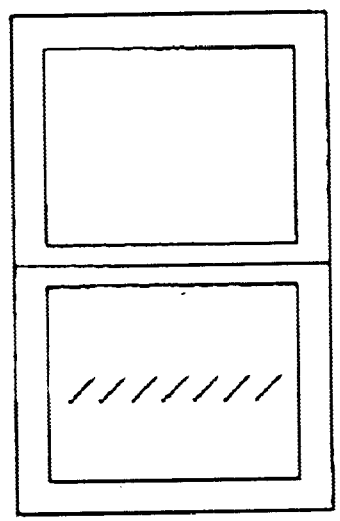
Figure 4C:
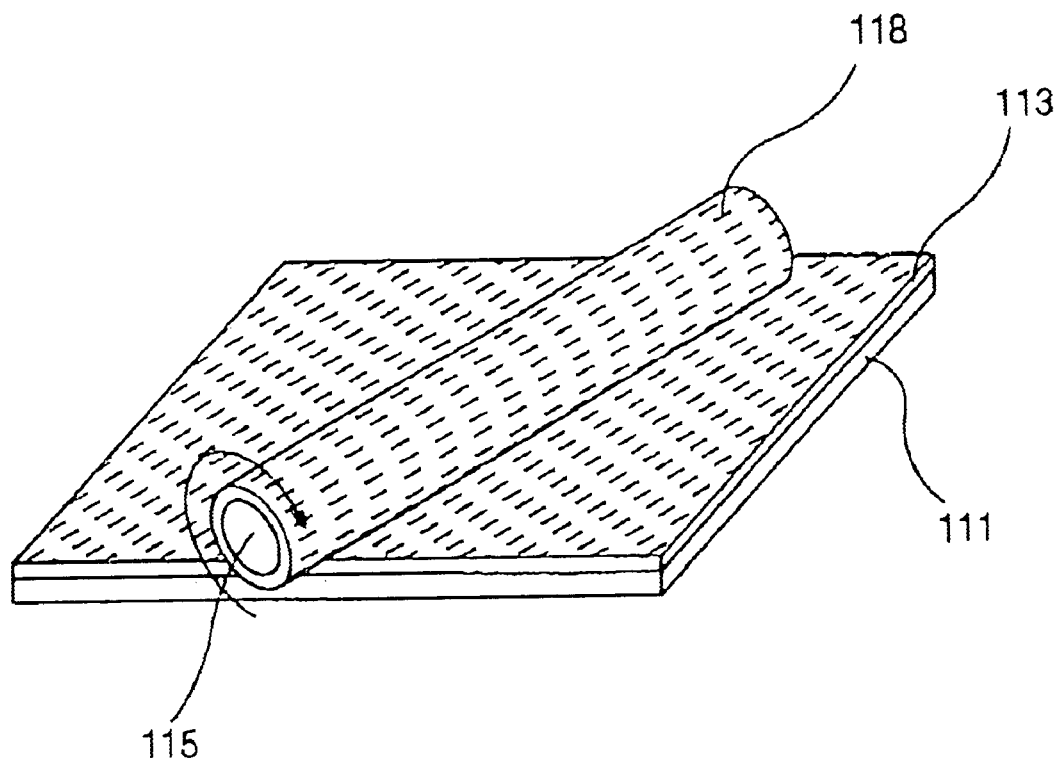

FIGS. 4A to 4C illustrate a rubbing process according to a preferred embodiment of the present invention. Initially, as shown in FIG. 4A, a roller 115 having a rubbing fabric 117 rotates to cover an orientation film 113 that is formed on a substrate 111. The substrate 111 has a color filter layer (shown as the reference 7 in FIG. 1) or a TFT array (not shown) thereon.

Preferably, a polyimide-based material is used for the above-mentioned orientation film 113. When a diamine compound and anhydride are reacted in a solvent, a polyamic acid is produced. A typical wax for spraying is a solution of the polyamic acid. Meanwhile, when the polyamic acid solution is treated via a dehydration process including drying, heating, and hardening step, polyimide is produced. Still referring to FIG. 4A, as the roller 115 rotates to roll on the orientation film 113, the surface of the orientation film 113 is uniformly rubbed by the rubbing fabric 117 wound around the roller 115. Since the rubbing fabric 117 has a plurality of woof and warp threads that are crossed with each other, a pattern of the minute grooves 113a are formed on the orientation film 113 during the above-mentioned rubbing process.

However, if the rubbing process is repeated for many orientation films, defects may occur on the surface of the rubbing fabric 117. The defects of the rubbing fabric 117 result from an extraneous matter on the orientation film 113, or patterns formed on the substrate 111 (shown in FIG. 1). The defects of the rubbing fabric 117 cause rubbing defects such as an irregular surface on the orientation film 113 (a scratch error) or a wave of the orientation film 113, which are shown in FIG. 4B. When the above-mentioned scratch error is detected, the rubbing fabric 117 as replaced with a new rubbing fabric 118. Thereafter, as shown in FIG. 4C, the orientation film 113 having a scratch error is rubbed again using the roller 115 wound by a new rubbing fabric 116.

Figure 5:
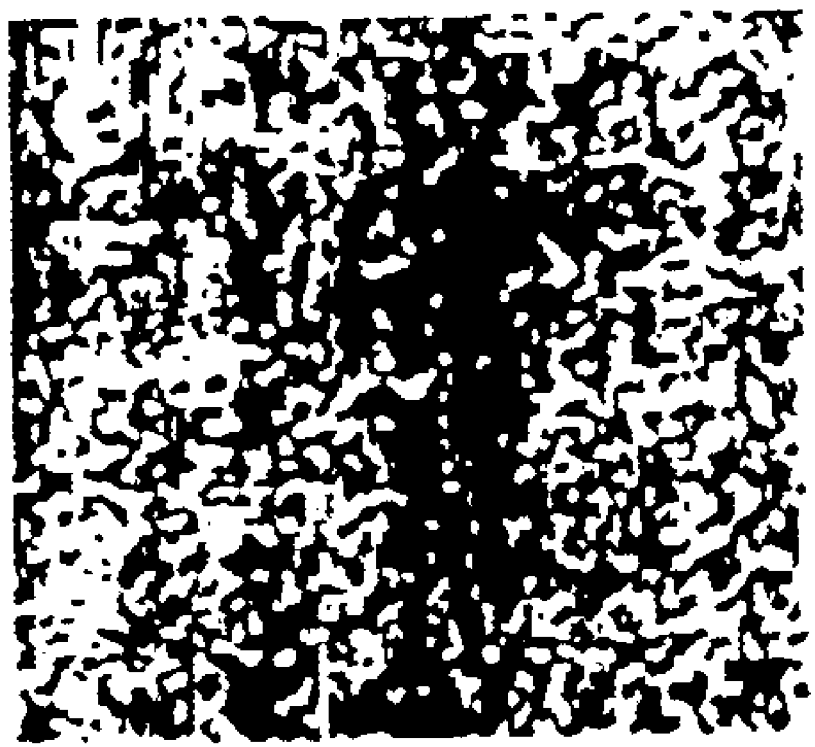
FIG. 5 is a photograph illustrating a surface of the orientation film having a stable alignment of liquid crystal molecules according to the present invention.

FIG. 5 shows a photograph of the surface of the orientation film 113 after the above-mentioned second rubbing step is completed. As shown in the drawing, a plurality of minute grooves is uniformly formed without a scratch error or wave of the orientation film 113.

For the above-mentioned double rubbing method according to the preferred embodiment, a hardening rate, or an imidation rate of the orientation film 113 becomes in the range of about 80 to 85%. In addition, according to experiments under various conditions, it is verified that less than three times of rubbings do not affect an alignment of the LCD device. Therefore, the double rubbing method does not affect a uniformly rubbed surface of the orientation film. Accordingly, by the double rubbing method according to the preferred embodiment, the rubbing defects are easily repaired.

It will be apparent to those skilled in the art that various modifications and variation can be made in the method of manufacturing a liquid crystal display device according to the principles of the present invention without departing from the spirit or scone of the invention. Thus, it is intended that the present invention covers the modifications and variations of this invention provided they come within the scope of the appended claims and their equivalents.

What is claimed is:

1. A method of rubbing for a liquid crystal display having a substrate, the method comprising the steps of:

rubbing an orientation film on the substrate using a first rubbing fabric;

detecting defects of the orientation film; and repeating the step of rubbing the orientation film using a second rubbing fabric when the defects are detected.

2. The method of claim 1, wherein the orientation film is polyimide.

3. The method of claim 2, wherein the polyimide has an imidation rate in the range of 80 to 85%.

4. The method of claim 1, further comprising the step of exchanging the first rubbing fabric with the second rubbing fabric after the step of detecting defects of the orientation film.

5. The method of claim 1, wherein the first and second fabrics are different from each other.

6. The method of claim 1, wherein the step of repeating the step of rubbing the orientation film substantially eliminates a rubbing error.

* * * * *